United States Patent Office 2,706,738
Patented Apr. 19, 1955

2,706,738

METHOD OF PREPARING PYROPHOSPHORTET-RAAMIDES OF SECONDARY ALIPHATIC AND SECONDARY HETEROCYCLIC AMINES IN THE PRESENCE OF AN INORGANIC BASE

Arthur Dock Fon Toy, Park Forest, and James R. Costello, Jr., Chicago Heights, Ill., assignors to Victor Chemical Works, a corporation of Illinois No Drawing. Application March 23, 1950,
Serial No. 151,532

14 Claims. (Cl. 260—545)

This invention relates to a process of preparing symmetrical pyrophosphortetraamides of secondary aliphatic amines by the reaction of an aliphatic secondary diamido phosphoryl chloride with water and a strong base.

The equation for this reaction may be represented as follows:

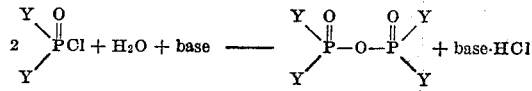

reaction product in which Y represents a secondary amido group chosen from the group consisting of dialkyl and heterocyclic amido groups.

Examples of diamido phosphoryl chlorides which may be used in our invention are bis(dimethylamido)phosphoryl chloride, bis (diethylamido)phosphoryl chloride, bis(dipropylamido)phosphoryl chloride, bis(dibutylamido)phosphoryl chloride, dipiperidino phosphoryl chloride, dimorpholido phosphoryl chloride and the like.

The reaction may be carried out in the presence of an inorganic base. This base should be of sufficient strength to initiate and maintain the reaction. The alkaline alkali metal compounds, such as alkali metal carbonates, hydroxides, bicarbonates and the like, may be used. These inorganic bases may be used alone or in combination with each other. The base may also be a mixture of a major proportion of an inorganic base and a minor proportion of an organic base.

The reaction is preferably carried out at 20° C. or above as below 20° C. the reaction proceeds but slowly. At least theoretical amounts of base and water should be used as less than these amounts will reduce the yields correspondingly. It is generally preferred to add a mixture of a base and water simultaneously to the secondary amido phosphoryl chloride, though satisfactory results may be obtained by adding the water and base separately. The stoichiometric amount of water required for the reaction may be generated in the reaction where certain inorganic bases, such as sodium bicarbonate, are used. A catalytic amount of water may be used to initiate the reaction in these instances and the reaction is maintained without further addition of water as additional water is given off as a product of the reaction. Greater than catalytic amounts of water do not appear to be detrimental to the reaction; hence additional water may be used even when bases such as sodium bicarbonate are used at any time before or during the reaction.

In both the specification and the claims, when we speak of reacting a diamido phosphoryl chloride with water and a base, it is to be understood that the water may be derived from the base itself or given off during the reaction, and we thereby mean to include the reaction of a diamido phosphoryl chloride with a base, as sodium bicarbonate, and only catalytic amounts of added water.

The reaction generally proceeds most satisfactorily at temperatures of about 40° to 80° C., but the process may be carried on at higher temperatures. At temperatures above 100° C. the reaction should be carried out under pressure to prevent evaporation of the water.

The general procedure followed is to add to the diamido phosphoryl chloride, either separately or together, an inorganic base and water, permitting the ingredients to react at above 20° C. for several hours, and preferably at 40° to 80° C. When the amido phosphoryl chloride reactant is a solid, it is desirable to dissolve it in an organic solvent, thereby increasing the rate of reaction and ultimate yield. Liquid amido phosphoryl chloride reactants are generally reacted with water and a base in the absence of an organic solvent. Though a solvent may be used, we have found that it generally does not aid the reaction if the amido phosphoryl chloride compound is a liquid. In either case, upon completion of the reaction the pyrophosphortetraamide product is separated from the solid salt formed during the reaction. This may be accomplished in cases where the product is not water soluble by washing with water, whereby the salts are dissolved, leaving a fairly pure water-insoluble residue as the product. Otherwise the product is separated from the salt by adding a solvent in which the pyrophosphortetraamide is selectively soluble. The salt may be removed by filtering or centrifuging and the product subsequently recovered from the filtrate (which consists of the pyrophosphortetraamide dissolved in a solvent) by distilling off the solvent. Suitable solvents for this purpose are carbon tetrachloride, ether, benzene and the like.

Octamethyl pyrophosphoramide obtained by reacting bis(dimethylamido)phosphoryl chloride with water in the presence of a suitable base is a water soluble liquid which is used as a systemic poison. The compound is absorbed by the planet through its leaves and roots, and renders the entire plant toxic to sucking insects. It is not necessary to purify the compound by distillation for this use as the crude product as obtained in this process makes a good insecticide.

*Example 1*

To 105.7 g. (0.62 mol) bis(dimethylamido)phosphoryl chloride there was added 52 g. (0.62 mol) sodium bicarbonate and 2 g. water. The reaction mixture started to bubble slowly. It was heated slowly to 50° C. and held at 50–55° C. until bubbling ceased. 150 ml. carbon tetrachloride was added to the slurry. After stirring for 1 hour and heating to 60° C., the slurry was filtered. Carbon tetrachloride was removed from the filtrate, leaving a liquid residue, octamethyl pyrophosphoramide weighing 60.4 g. (68.3%).

*Example 2*

To 121.8 g. (0.71 mol) bis(dimethylamido)phosphoryl chloride there was added 30 g. (0.75 mol) flake sodium hydroxide. No reaction occurred. 2 g. water was added to the mixture and the temperature rose 2° C. An additional 4.4 g. water was added making 100% excess water. The mixture was allowed to react overnight during which time the temperature rose to above 70° C. After cooling to room temperature, 100 ml. CCl₄ was added, and the slurry stirred for an additional hour and then filtered. The CCl₄ was removed from the filtrate by distillation, leaving a crude residual liquid of octamethyl pyrophosphoramide which weighed 40.6 g. (40% yield, $N_D^{25}$ 1.4665, while that of the pure product is normally 1.4620).

A combination of organic and inorganic bases may be employed in the reaction. For example, we may utilize a small proportion of a strong organic base, such as a tertiary amine, with the requisite amount of a cheap inorganic base to obtain the product in high yields. The organic base is preferably a tertiary amine of a strength at least equal to that of pyridine. An excellent organic base is a trialkyl amine, for example, triethyl amine. In a similar category are the tertiary aralkyl amines, such as tribenzyl amine and dimethyl benzyl amine.

A practical measurement for determining comparative base strengths of organic amine compounds is by comparison of their ionization constants. Pyridine has an ionization constant of $2.3 \times 10^{-9}$, alpha-picoline $3.2 \times 10^{-8}$, trimethyl amine $7.4 \times 10^{-5}$, triethyl amine $6.4 \times 10^{-4}$ and dimethyl benzylamine $1.05 \times 10^{-5}$. Amines weaker than pyridine may be employed in conjunction with inorganic bases, but this is not generally preferred. In the preferred process where a mixture of bases is employed, the inorganic base is used in substantially not less than stoichiometric amounts, while the tertiary amine is used in a catalytic amount.

*Example 3*

To 132.5 g. (0.78 mol) bis(dimethylamido)phosphoryl chloride there was added a catalytic amount (0.7 g.) of water and a small amount (6.2 g.) of pyridine. The temperature rose one degree to 30° C. Then 68.6 g. (0.81 mol) sodium bicarbonate was added after cooling to 25° C. The temperature rose to 30° C. in half an hour and carbon dioxide was slowly liberated. The temperature was raised slowly to 50° C. in 2¼ hours and maintained there for two more hours. Upon completion of the reaction, 200 ml. carbon tetrachloride was added and the slurry stirred for one hour. It was then filtered to remove the solid sodium chloride. The carbon tetrachloride was removed by distillation, leaving 92.5 g. of crude octamethyl pyrophosphoramide (84% yield).

The above example illustrates the combined use of a small amount of tertiary amine together with the requisite amount of a cheap inorganic base to obtain the product in high yields. It also illustrates that when a base such as sodium bicarbonate is used, only a catalytic amount of water is initially necessary to start the reaction, the stoichiometric amount of water being generated in the reaction.

The foregoing detailed description is given for clearness of understanding only and no unnecessary limitations should be understood therefrom as modifications will be obvious to those skilled in the art.

We claim:

1. The method of making a pyrophosphortetraamide of a secondary amine comprising reacting a member of the class consisting of a bis(dialkylamido) phosphoryl chloride in which the alkyl group contains from 1 to 4 carbon atoms, dipiperidino phosphoryl chloride and dimorpholido phosphoryl chloride with water in the presence of a base to form the pyrophosphortetraamide in a single step reaction, said base including at least a major proportion of an alkali metal base, and separating the resulting pyrophosphortetraamide.

2. The method of claim 1 wherein said reaction is carried out at a temperature of at least 20° C.

3. The method of claim 1 wherein said alkali metal base is sodium hydroxide.

4. The method of claim 1 wherein said alkali metal base is sodium bicarbonate.

5. The method of claim 1 wherein said aklali metal base is sodium bicarbonate and wherein a major proportion of the stoichiometric amount of water is supplied by said sodium bicarbonate as a product of the reaction.

6. The method of claim 1 wherein said temperature is maintained between about 40 and 80° C.

7. The method of claim 1 wherein said phosphoryl chloride is bis(dimethylamido)phosphoryl chloride.

8. The method of claim 1 wherein said amide product is separated by selectively dissolving said product in an inorganic solvent, filtering and evaporating the solvent.

9. The method of making a symmetrical pyrophosphortetraamide of a secondary amine comprising mixing a member of the class consisting of bis(dialkylamido) phosphoryl chlorides in which the alkyl group contains from 1 to 4 carbon atoms, dipiperidino phosphoryl chloride and dimorpholido phosphoryl chloride with at least stoichiometric amounts of water and a mixture of bases comprising a major proportion of an alkali metal base and a minor proportion of a tertiary amine, each of said base and amine having an ionization constant at least substantially equal to that of pyridine, maintaining a temperature of at least 20° C. until the reaction is substantially complete, and separating the resulting pyrophosphortetraamide.

10. The method of claim 9 wherein said alkali metal base is sodium bicarbonate and wherein a major proportion of the stoichiometric amount of water is supplied by said sodium bicarbonate as a product of the reaction.

11. The method of claim 9 wherein the tertiary amine comprises pyridine.

12. The method of making a pyrophosphortetraamide of a secondary amine comprising reacting a member of the class consisting of a bis (dialkylamido) phosphoryl chloride in which the alkyl group contains from 1 to 4 carbon atoms, dipiperidino phosphoryl chloride and dimorpholido phosphoryl chloride with water in the presence of a base including at least a major proportion of an alkali metal base and separating the resulting pyrophosphortetraamide, the base and phosphoryl chloride compound being present in approximately equimolar proportions in order that substantially all of the acid formed during the reaction will be neutralized.

13. The method of making a pyrophosphortetraamide of a secondary amine comprising reacting a member of the class consisting of a bis(dialkylamido) phosphoryl chloride in which the alkyl group contains from 1 to 4 carbon atoms, dipiperidino phosphoryl chloride and dimorpholido phosphoryl chloride with water in the presence of a base including at least a major proportion of an alkali metal base and separating the resulting pyrophosphortetraamide, said reaction being carried out in the presence of a solvent for any of the reaction product of the base and the diamido phosphoryl chloride compound that may be formed so that the pyrophosphortetraamide product is produced in a single step reaction.

14. The method of making a pyrophosphortetraamide of a secondary amine comprising reacting a bis(dialkylamido) phosphoryl chloride in which the alkyl groups contain from 1–4 carbon atoms with water in the presence of a base to form the pyrophosphortetraamide in a single step reaction, said base including at least a major proportion of an alkali metal base, and separating the resulting pyrophosphortetraamide.

References Cited in the file of this patent

UNITED STATES PATENTS

| 2,502,966 | Kosolapoff | Apr. 4, 1950 |

FOREIGN PATENTS

| 631,549 | Great Britain | Nov. 4, 1949 |

OTHER REFERENCES

Australian pat. application Ser. No. 23,752/48. Open for public inspection November 18, 1948. Abstract published January 5, 1949.